US011810301B2

United States Patent
Ravishankar et al.

(10) Patent No.: US 11,810,301 B2
(45) Date of Patent: Nov. 7, 2023

(54) SYSTEM AND METHOD FOR IMAGE SEGMENTATION USING A JOINT DEEP LEARNING MODEL

(71) Applicant: General Electric Company, Schenectady, NY (US)

(72) Inventors: Harihan Ravishankar, Bangalore (IN); Vivek Vaidya, Bangalore (IN); Sheshadri Thiruvenkadam, Bangalore (IN); Rahul Venkataramani, Bangalore (IN); Prasad Sudhakar, Bangalore (IN)

(73) Assignee: General Electric Company, Schenectady, NY (US)

( * ) Notice: Subject to any disclaimer, the term of this patent is extended or adjusted under 35 U.S.C. 154(b) by 328 days.

(21) Appl. No.: 17/227,093

(22) Filed: Apr. 9, 2021

(65) Prior Publication Data
US 2021/0233244 A1 Jul. 29, 2021

Related U.S. Application Data

(63) Continuation of application No. 16/469,373, filed as application No. PCT/US2017/066292 on Dec. 14, 2017, now Pat. No. 10,997,724.

(51) Int. Cl.
*G06T 7/10* (2017.01)
*G06F 17/15* (2006.01)
*G06N 3/045* (2023.01)

(52) U.S. Cl.
CPC .............. *G06T 7/10* (2017.01); *G06F 17/15* (2013.01); *G06N 3/045* (2023.01); *G06T 2207/20084* (2013.01)

(58) Field of Classification Search
CPC ........ G06F 17/15; G06N 20/00; G06N 3/045; G06T 2207/20084; G06T 2207/30004; G06T 7/10; G06T 7/00; G06T 1/00
See application file for complete search history.

(56) References Cited

U.S. PATENT DOCUMENTS

| 10,225,462 B2* | 3/2019 | Murakami | H04N 23/635 |
| 10,426,442 B1* | 10/2019 | Schnorr | A61B 8/5223 |
| 10,698,204 B1* | 6/2020 | Ouderkirk | G02B 5/208 |
| 2004/0066966 A1* | 4/2004 | Schneiderman | G06F 18/214 |
| | | | 382/224 |
| 2010/0054538 A1* | 3/2010 | Boon | G06T 7/60 |
| | | | 382/104 |
| 2010/0182433 A1* | 7/2010 | Shimbo | G06V 10/143 |
| | | | 348/E7.085 |

(Continued)

OTHER PUBLICATIONS

Guodong Zeng , "3D U-net with Multi-level Deep Supervision-:Fully Automatic Segmentation of Proximal Femur in 3D MR Images", Sep. 7, 2017,MLMI 2017: Machine Learning in Medical Imaging,pp. 274-278.*

(Continued)

*Primary Examiner* — Omar S Ismail

(57) ABSTRACT

A method for image segmentation includes receiving an input image. The method further includes obtaining a deep learning model having a triad of predictors. Furthermore, the method includes processing the input image by a shape model in the triad of predictors to generate a segmented shape image. Moreover, the method includes presenting the segmented shape image via a display unit.

12 Claims, 7 Drawing Sheets

(56) References Cited

U.S. PATENT DOCUMENTS

| | | | | |
|---|---|---|---|---|
| 2012/0206335 | A1* | 8/2012 | Osterhout | G06F 1/163 345/156 |
| 2014/0350395 | A1* | 11/2014 | Shachaf | A61B 5/4887 600/431 |
| 2015/0309568 | A1* | 10/2015 | Miki | G06F 3/0304 345/173 |
| 2016/0026253 | A1* | 1/2016 | Bradski | H04N 13/128 345/8 |
| 2016/0174902 | A1* | 6/2016 | Georgescu | G06V 10/454 600/408 |
| 2017/0192499 | A1* | 7/2017 | Trail | G06F 1/163 |
| 2017/0372155 | A1 | 12/2017 | Odry et al. | |
| 2018/0253865 | A1 | 9/2018 | Price et al. | |
| 2018/0315188 | A1* | 11/2018 | Tegzes | G06T 7/11 |
| 2019/0371450 | A1* | 12/2019 | Lou | G16H 20/40 |
| 2020/0016745 | A1* | 1/2020 | Tang | B25J 11/0005 |
| 2020/0069973 | A1* | 3/2020 | Lou | A61B 6/032 |
| 2020/0167930 | A1* | 5/2020 | Wang | G06N 3/08 |
| 2020/0395117 | A1* | 12/2020 | Schnorr | G06N 3/088 |
| 2021/0233244 | A1* | 7/2021 | Ravishankar | G06N 3/045 |
| 2021/0350179 | A1* | 11/2021 | Bello | G06F 18/2148 |

OTHER PUBLICATIONS

Ishan Misra, "Cross-stitch Networks for Multi-task Learning", Jun. 2016, Proceedings of the IEEE Conference on Computer Vision and Pattern Recognition (CVPR), 2016,pp. 3994-3999.*

Jun Zhang,"Detecting Anatomical Landmarks From Limited Medical Imaging Data Using Two-Stage Task-Oriented Deep Neural Networks", Jun. 28, 2017,IEEE Transactions on Image Processing, vol. 26, No. 10, Oct. 2017, pp. 4753-4760.*

Hariharan Ravishankar,"Joint Deep Learning of Foreground, Background and Shape for Robust Contextual Segmentation", May 23, 2017,IPMI 2017: Information Processing in Medical Imaging ,pp. 622-629.*

Kuan-Iun tseng, "Joint Sequence Learning and Cross-Modality Convolution for 3D Biomedical Segmentation," Jul. 2017, Proceedings of the IEEE Conference on Computer Vision and Pattern Recognition (CVPR), 2017, pp. 6393-6397.*

Jie Wei,"Multi-scale Networks for Segmentation of Brain Magnetic Resonance Images",Sep. 9, 2017,DLMIA 2017, ML-CDS 2017: Deep Learning in Medical Image Analysis and Multimodal Learning for Clinical Decision Support , pp. 314-317.*

Nicolas Heess,"Weakly Supervised Learning of Foreground-Background Segmentation Using Masked RBMs", Jul. 19, 2011, ICANN 2011: Artificial Neural Networks and Machine Learning—ICANN 2011,pp. 9-15.*

Torresan et al., "Advanced Surveillance Systems: Combining Video and Thermal Imagery for Pedestrian Detection", Apr. 12, 2004, Proc. of SPIE vol. 5405 Apr. 12, 2004, pp. 506-511.*

Heess, N. et al., "Weakly Supervised Learning of Foreground-Background Segmentation using Masked RBMs," Proceedings of the International Conference on Artificial Neural Networks (ICANN 2011), Artificial Networks and Machine Learning, Jun. 14, 2011, Espoo, Finland, 8 pages.

Misra, I. et al., "Cross-stitch Networks for Multi-task Learning," Proceedings of the IEEE Conference on Computer Vision and Pattern Recognition (CVPR), Jun. 27, 2016, Las Vegas, Nevada, 10 pages.

Ravishankar, H. et al., "Joint Deep Learning of Foreground, Background and Shape for Robust Contextual Segmentation," Proceedings of the International Conference on Information Processing in Medical Imaging (IPMI 2017), Jun. 25, 2017, Boone, North Carolina, 13 pages.

ISA European Patent Office, International Search Report Issued in Application No. PCT/US2017/066292, dated Mar. 7, 2018, WIPO, 2 pages.

ISA European Patent Office, Written Opinion of the International Search Authority Issued in Application No. PCT/US2017/066292, dated Mar. 7, 2018, WIPO, 7 pages.

* cited by examiner

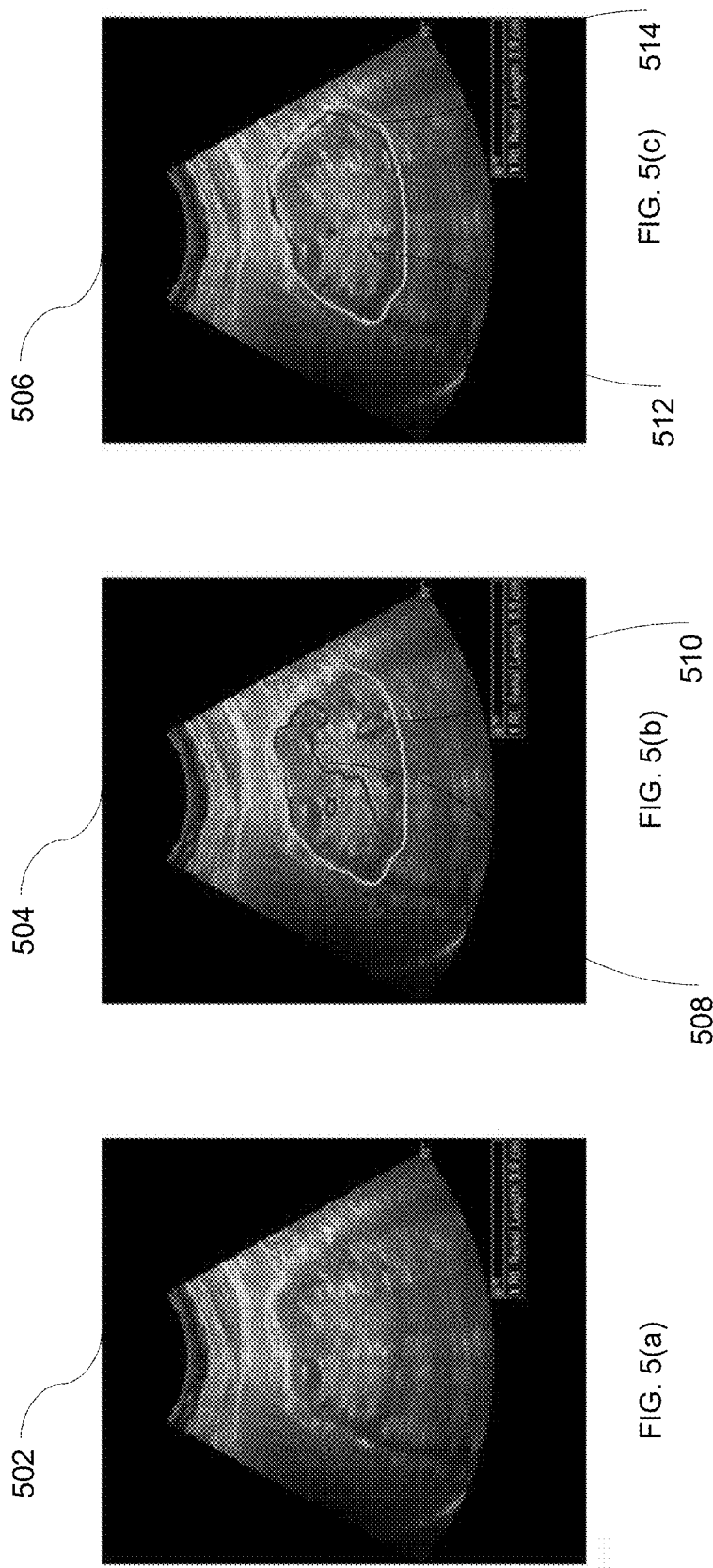

SYSTEM AND METHOD FOR IMAGE SEGMENTATION USING A JOINT DEEP LEARNING MODEL

CROSS REFERENCE TO RELATED APPLICATIONS

The present application is a continuation of U.S. Non-Provisional patent application Ser. No. 16/469,373, entitled "SYSTEM AND METHOD FOR IMAGE SEGMENTATION USING A JOINT DEEP LEARNING MODEL", and filed on Jun. 13, 2019. U.S. Non-Provisional patent application Ser. No. 16/469,373 is a U.S. National Phase of International Application No. PCT/US2017/066292, entitled "SYSTEM AND METHOD FOR IMAGE SEGMENTATION USING A JOINT DEEP LEARNING MODEL", and filed on Dec. 14, 2017. The entire contents of the above-listed applications are hereby incorporated by reference for all purposes.

FIELD

Embodiments of the present specification relate generally to contextual segmentation of medical images, and more particularly to systems and methods for joint deep learning of foreground, background, and shape using generative models for use in contextual segmentation of medical images.

BACKGROUND

Segmentation or object delineation from medical images/volumes is a fundamental step for subsequent quantification tasks that are key enablers of medical diagnosis. In general, segmentation of images entails detection, coarse segmentation, and segmentation of finer details. Typically, some challenges in segmentation or object delineation from medical images include noise inherent in images such as ultrasound images, positron emission tomography (PET) images, and the like, varying contrast inherent to imaging modalities, multimodal intensity variations of X-Ray, magnetic resonance (MR), and ultrasound images, and complex shapes within the images. Traditional techniques generally call for the detection of the object in the images followed by exact segmentation.

Moreover, traditional segmentation approaches employ geometric priors, foreground/background intensity models, and shape priors. Some challenges encountered by the traditional approaches include initialization of the segmentation task, modeling of complex textures and/or shapes, hyperparameter tuning, and computational timing. Machine learning approaches configured to learn complex foreground/background intensities have been used to circumvent some of these challenges. Also, other approaches include use of shape models that are developed based on training data. The machine learning approaches and the shape model based approaches are then plugged into standard segmentation frameworks.

Recent fully convolutional network (FCN)-based approaches provide a single framework for end-to-end detection and segmentation of objects enabled via learning contexts and interactions between shape and texture, for example, U-Net. Moreover, FCN-based approaches also extend themselves to the generalizability of different problems given appropriate training data. However, fully convolutional networks (FCNs) require a significant amount of representative training data to facilitate the learning of the multiple entities such as the foreground, background, shape, and the contextual interactions of these entities. With limited or insufficient training data, failures are hard to interpret. Moreover, manual selection of data to improve performance may be problematic.

SUMMARY

In accordance with one aspect of the present specification, a method is disclosed. The method includes receiving an input image. Furthermore, the method includes obtaining a deep learning having a triad of predictors. The method also includes processing the input image by a shape model in the triad of predictors to generate a segmented shape image. Moreover, the method includes presenting the segmented shape image via a display unit.

In accordance with another aspect of the present specification, a system is disclosed. The system includes an image acquisition unit configured to acquire an input image. In addition, the system includes a deep learning unit including a deep learning model, where the deep learning model includes a triad of predictors. The deep learning unit is configured to process the input image by a shape model in the triad of predictors to generate a segmented shape image. Moreover, the system includes a processor unit communicatively coupled to the deep learning unit and configured to present the segmented shape image via a display unit.

BRIEF DESCRIPTION OF THE DRAWINGS

These and other features and aspects of embodiments of the present specification will become better understood when the following detailed description is read with reference to the accompanying drawings in which like characters represent like parts throughout the drawings, wherein:

FIGS. 5(a)-5(c) are images illustrating a comparison of the performance of the deep learning model of FIG. 1 with the performance of an extant fully convolutional network in segmenting an abdominal region from input images, in accordance with aspects of the present specification;

DETAILED DESCRIPTION

Fully convolutional networks (FCNs) lend themselves well to bringing contexts into learning for segmentation. In accordance with aspects of the present specification, systems and methods for contextual segmentation of an image using a hybrid of generative modeling of image formation using a fully convolutional network (FCN) to jointly learn the triad of foreground (F), background (B) and shape (S) are presented. Such generative modeling of the triad of the foreground, background, and shape based on the FCN aids in capturing contexts. Further, the systems and methods may be used with a smaller training data set. Also, these systems and methods provide results that are easy to interpret and enable easy transfer of learning across segmentation problems.

Figure 1:
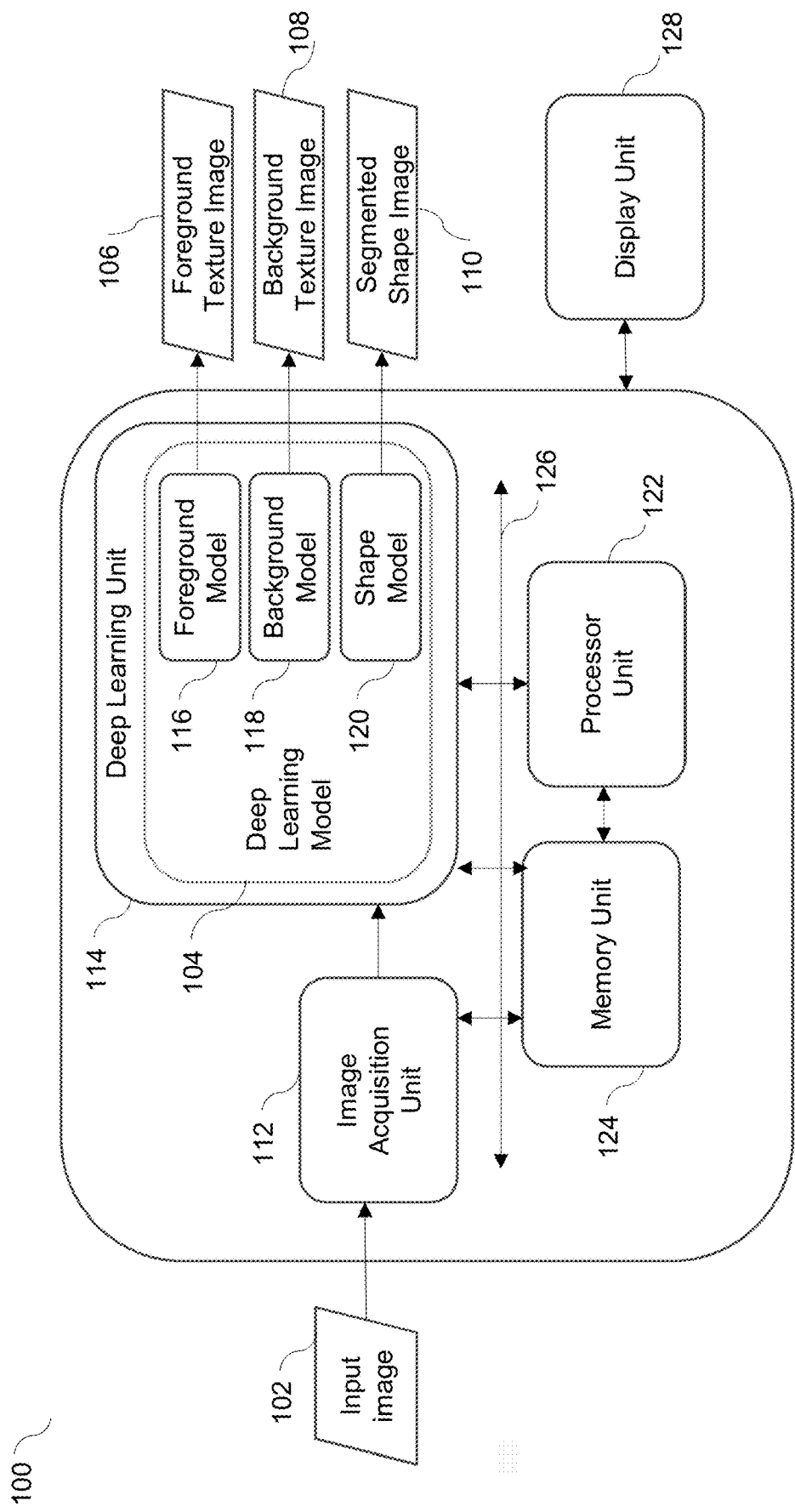
FIG. 1 is a block diagram illustrating a system for image segmentation using a joint deep learning model, in accordance with aspects of the present specification.

FIG. 1 is a block diagram illustrating a system 100 for image segmentation using a joint deep learning model, in accordance with aspects of the present specification. The image segmentation system 100 is used in contextual segmentation of medical images based on a learning model generated by a joint deep learning of foreground, background, and shape models. More particularly, the image segmentation system 100 includes an image acquisition unit 112 configured to acquire an input image 102 corresponding to a subject.

In one embodiment, the input image 102 is a two-dimensional (2D) image and the image segmentation refers to a 2D image segmentation. In another embodiment, the input image 102 may refer to a three-dimensional (3D) image and the image segmentation refers to a 3D image segmentation. The term 'subject' used herein refers to a patient, an organ of interest in the patient, a machine part, or any other object to be analyzed via the input image 102.

The image segmentation system 100 further includes a deep learning unit 114 that includes a deep learning model 104. In one embodiment, the deep learning model 104 is a fully convolutional network (FCN). Specifically, the deep learning model 104 is implemented as a multi-channel FCN. In the illustrated embodiment, the deep learning model 104 is a multi-channel FCN having a triad of predictors 116, 118, 120. The multi-channel FCN may be implemented based on a parallel U-Net architecture having separate weights for each of the triad of predictors. In another embodiment, the multi-channel FCN is implemented based on shared U-Net architecture having shared weights for the triad of predictors.

In the example of FIG. 1, the deep learning model 104 is depicted as a tri-channel FCN having a foreground model 116, a background model 118, and a shape model 120. The input image 102 is provided to the deep learning model 104 and the deep learning model 104 is configured to generate three output channels 106, 108 and 110. In particular, reference numeral 106 is used to represent a foreground texture image generated by the foreground model 116, while reference numeral 108 is used to represent a background texture image generated by the background model 118. Also, a segmented shape image generated by the shape model 120 is represented by reference numeral 110. The image segmentation system 100 further includes a processor unit 122 and a memory unit 124 communicatively coupled to the image acquisition unit 112 and the deep learning unit 114 via a communication bus 126.

In standard FCN formulation, such as the U-Net, given training examples of pairs of images and segmentations masks $\{I_k, S_k\}_{k=1, 2, \ldots, N}$, a framework learns a predictor $\hat{S}_w[.]$ defined by parameters w that minimizes a training loss such as a root-mean-square error $$\frac{1}{N}\sum_k |\hat{S}_W[I_k] - S_k|^2.$$

In accordance with aspects of the present specification, a triad of predictors $\hat{F}_{w_1}[.], \hat{B}_{w_2}[.], \hat{S}_{w_3}[.]$ that minimizes the following possibilities for the training loss may be defined in accordance with equations (1) and (2).

$$FBS_1 : \frac{1}{N}\sum_k |\hat{F}_{W_1}[I_k] - S_k \cdot I_k|^2 + \qquad (1)$$

$$|\hat{B}_{W_2}[I_k] - (1 - S_k) \cdot I_k|^2 + |\hat{S}_{W_3}[I_k] - S_k|^2$$

such that $\hat{S}_{W_3}[I_k] \in \{0, 1\}$.

The first two terms of equation (1) learn the foreground and background predictors respectively. The last term of equation (1) learns the representation for the object shape.

Additionally, a simpler notation may be employed to define the triad of predictors in accordance with equation (2).

$$FBS_2 : |I_k - (\hat{S}_k \hat{F}_k + (1 - \hat{S}_k)\hat{B}_k)|^2 + \qquad (2)$$

$$|I_k - (S_k \hat{F}_k + (1 - S_k)\hat{B}_k)|^2 + |\hat{S}^2 - S_k|^2$$

such that $\hat{S} \in \{0, 1\}$

It may be noted that in equation (2), simpler notations have been used. For example, $\hat{S}_k$ is used instead of $\hat{S}_{w_3}[I_k]$. The second term in equation (2) includes the foreground/background predictors, while the first term includes an image formation model. The last term in equation (2) includes a shape predictor.

In both $FBS_1$ and $FBS_2$ of equations (1) and (2), the predictor $\hat{S}_k$ is influenced by the predictions of $\hat{F}_k$, $\hat{B}_k$. Additionally, the formulations of equations (1) and (2) may be supplemented with geometric priors such as length shortening, curvature smoothness, a shape dictionary prior, reflectance, and the like.

The formulations $FBS_1$ and $FBS_2$ of equations (1) and (2) are implemented as multi-channel regression output FCNs with appropriate loss functions like mean squared error, mean absolute error, and the like, for texture prediction and binary cross entropy for shape. Specifically, the output layers of the FCNs include three channels for predicting the foreground texture image 106, the background texture image 108, and the segmented shape image 110, respectively.

In another embodiment, each of the triad of predictors in equation (1) may be modified based on a convolutional de-noising autoencoder (CDAE) having a p-dimensional shape projection (encoder) E and a decoder R. The encoder-decoder pair of the CDAE is configured to provide de-noising of input images based on a convolutional neural network. The encoder E is configured to project any arbitrary shape S to one of a plurality of ground truth segmentation masks characterizing a shape space M representative of a geometric prior. The RMSE function is modified as:

$$PRE_1 : \frac{1}{N}(|\hat{S}_k - (R \circ E)[\hat{S}_k]|^2) + \lambda_1 |E[S_k] - E[\hat{S}_k]|^2 + \lambda_2 |S_k - \hat{S}_k|^2 \qquad (3)$$

where $\hat{S}_k = \hat{S}_W[I_k]$.

The first term in the equation (3) is a projection error cost term and is based on a distance between the predicted shape and the shape space M. The second term in equation (3) is representative of a cost term that is based on a distance between the encoded representation of the segmentation mask and the predicted mask. The third term in the equation (3) is a Euclidean cost term that is based on a distance between ground truth segmentation masks and the predicted masks from the shape space M. Although the equation (3) corresponds to a cost function representative of shape regularization, similar cost functions may be added for background texture regularization and forward texture regularization in equation (1). It may also be noted that equation (2) may also be modified in a similar way to account for projection error, representation errors, and Euclidean errors.

Figure 7:
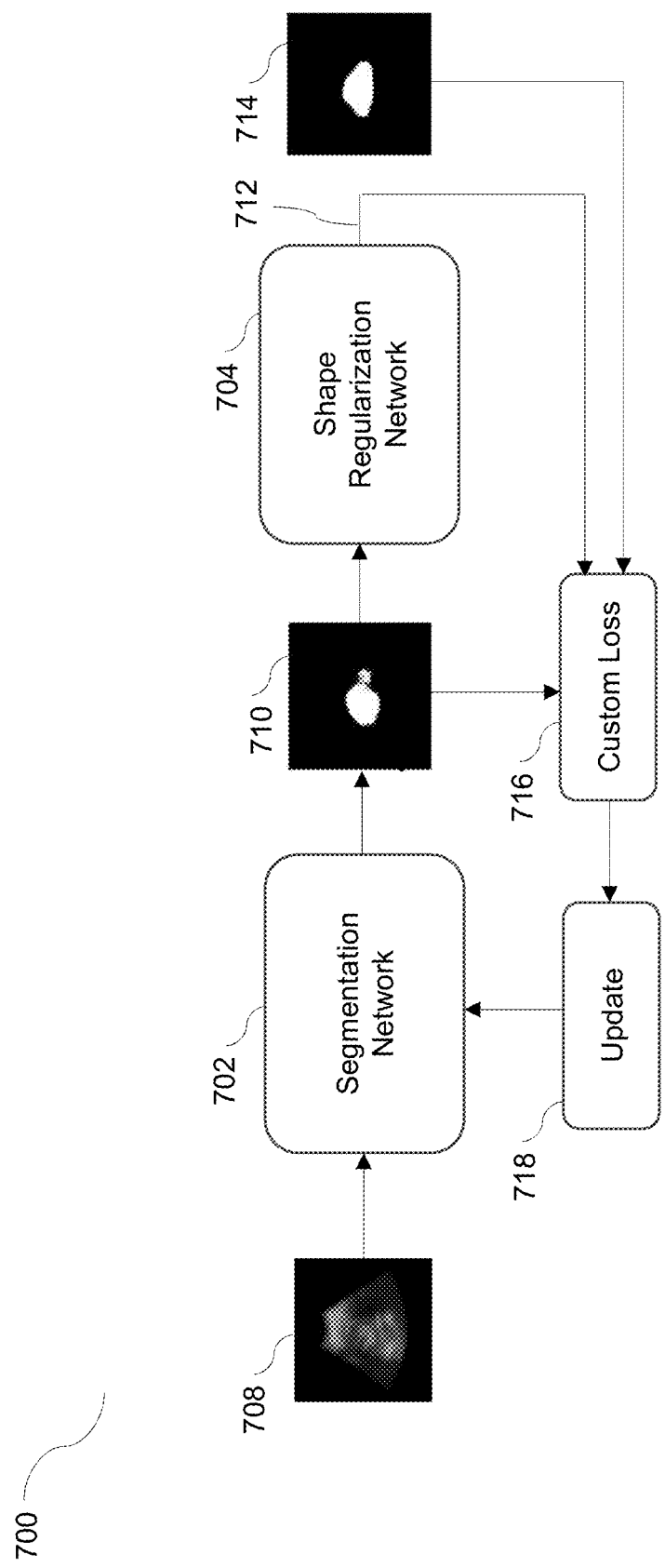
FIG. 7 is a block diagram of a shape regularized deep learning model, in accordance with aspects of the present specification.

In one embodiment, the shape regularization of equation (3) may be implemented as illustrated in FIG. 7. Referring now to FIG. 7, a block diagram of a shape regularized deep learning model 700, in accordance with one aspect of the present specification, is presented. The shape regularized deep learning model 700 includes a first fully convolutional network 702 cascaded with a second fully convolutional network 704.

Moreover, the first FCN 702 may be referred to as a segmentation network, while the second FCN 704 may be referred to as a shape regularization network. The first FCN 702 is configured to process an input image 708 and generate a segmented image 710. The second FCN 704 is configured to constrain the segmented image 710 to an autoencoder output image 712 in a manifold (represented by M) defined by a plurality of training images 714. In one embodiment, a vanilla U-Net architecture is used as the first FCN 702 and the second FCN 704 when the subject is a patient and the input image is a medical image.

Further, the second FCN 704 includes an encoder (E) and a decoder (R). The output of the first FCN 702 contributes to the third term in equation (3) and the output of the second FCN 704 contributes to the first two terms of the equation (3). In addition, the second FCN 704 is pre-trained based on a plurality of training images. Also, the first FCN is updated based on a custom loss function 716. The custom loss function in turn is determined based on the segmented image 710, the autoencoder output image 712, and a ground truth image 714.

With returning reference to FIG. 1, implementing the image segmentation system 100 as described with respect to FIG. 1 aids in processing the input image 102 to separately generate/predict the foreground texture image 106, the background texture image 108, and the segmented shape image 110. Moreover, one or more of the foreground texture image 106, the background texture image 10, and the segmented shape image 110 may be visualized on a display unit 128 to aid in providing medical care to the subject such as a patient.

Figure 2D:
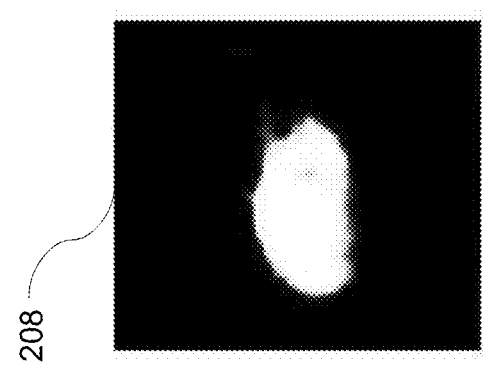
FIGS. 2(b)-2(d) are tri-channel output images generated subsequent to processing of the input image of FIG. 2(a) by the deep learning model of FIG. 1, in accordance with aspects of the present specification.
Figure 2C:
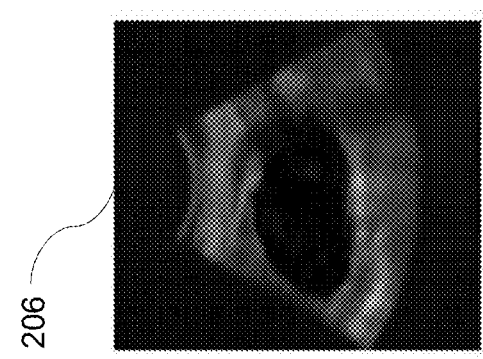
Figure 2B:
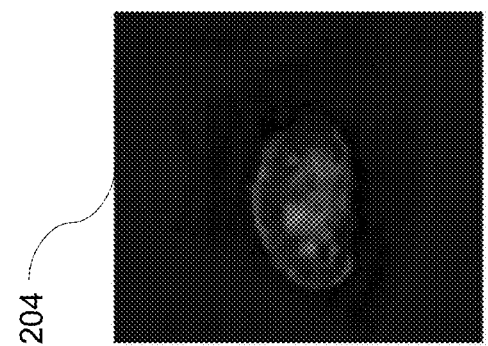
Figure 2A:
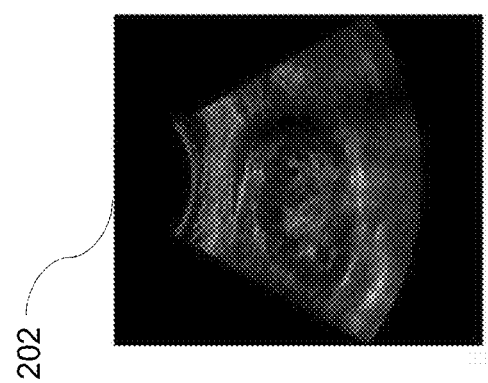
FIG. 2(a) is an input image supplied to the deep learning model of FIG. 1, in accordance with aspects of the present specification.

FIG. 2(a) is an input image 202 supplied to a deep learning model/fully convolutional network (FCN) of FIG. 1, in accordance with aspects of the present specification. In one embodiment, the input image may be an ultrasound image 202. Further, FIGS. 2(b)-2(d) are tri-channel output images 204, 206, 208 generated subsequent to processing of the input image 202 of FIG. 2(a) by the FCN. More particularly, FIG. 2(a) is representative of the input image 202 such as an ultrasound image that is provided as an input to the FCN/deep learning model 104 of FIG. 1.

Also, FIG. 2(b) is representative of an output image 204 of a foreground texture generated by the deep learning model 104. In one example, the foreground texture image 204 is representative of the foreground texture image 106 of FIG. 1. In a similar fashion, FIG. 2(c) is representative of an output image 206 of a background texture generated by the deep learning model 104. In one example, the background texture image 206 is representative of the background texture image 108 of FIG. 1. Additionally, FIG. 2(d) is representative of an output image 208 of a segmented shape generated by the deep learning model 104. In one example, the segmented shape image 208 is representative of the segmented shape image 110 of FIG. 1.

It may be noted that determining the deep learning model 104 based on the formulations $FBS_1$ and/or $FBS_2$ of equations (1) and (2) provide a robust shape predictor due to the complementarity of the triad of predictors. Simultaneously determining the triad of predictors for a given choice of training data ensures superior deep learning model based image segmentation.

Figure 3C:
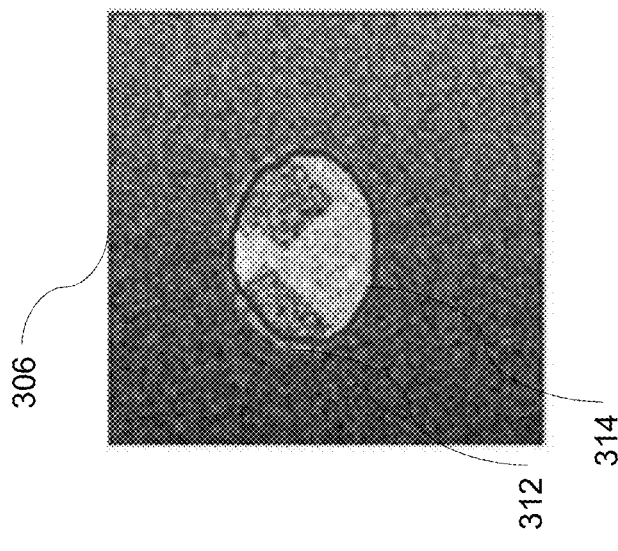
FIGS. 3(a)-3(c) are images illustrating a comparison of the performance of the deep learning model of FIG. 1 with the performance of an extant fully convolutional network in segmenting a shape boundary from input images, in accordance with aspects of the present specification.
Figure 3B:
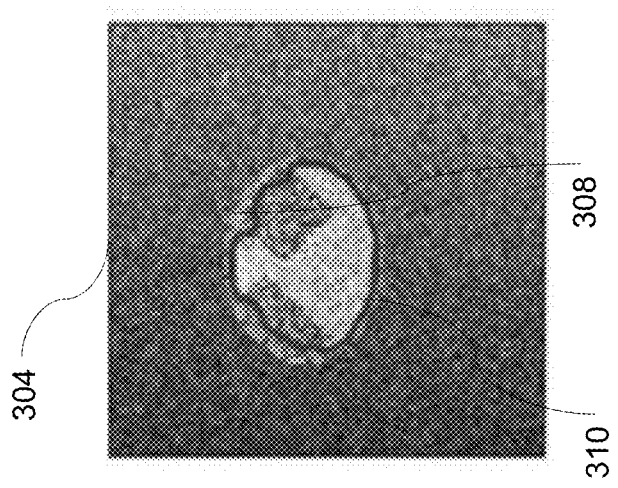
Figure 3A:
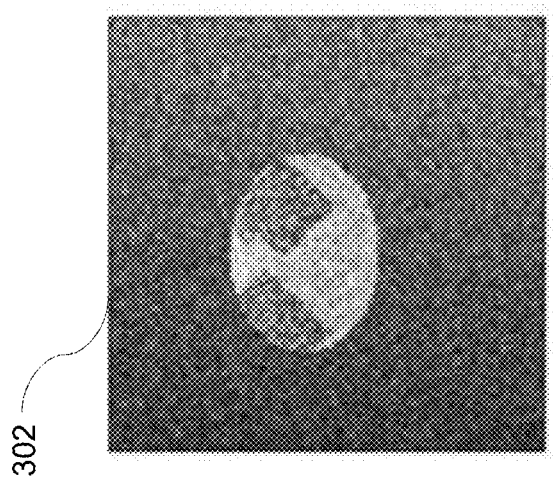

FIGS. 3(a)-3(c) are images that illustrate a comparison of the performance of the exemplary deep learning model 104 with the performance of an extant FCN in segmenting a shape boundary from input images, in accordance with aspects of the present specification. FIG. 3(a) is representative of an input image 302 such as an ultrasound image that is provided to the deep learning model 104 and/or an extant FCN such as U-Net.

Further, FIG. 3(b) is representative of an output image 304 generated by the extant FCN such as the U-Net. In extant FCN based methods, a larger set training data is needed to abstract the foreground/background texture, the shape, and relations of the textures with the shape. Reference numeral 308 is representative of a ground truth of a shape boundary of the object in the image 304. As seen in the illustrative example of FIG. 3(b), the output image 304 shows incomplete generation of a shape boundary 310 in regions of poor contrast.

Moreover, FIG. 3(c) is representative of an output image 308 generated by the deep learning model 104 of FIG. 1. In FIG. 3(c), reference numeral 312 is representative of a ground truth of a shape boundary of the object in the image 306. As seen in the illustrative example of FIG. 3(c), the output image 304 shows a complete shape boundary 314.

It may be noted that processing the input image 302 via the FBS1 formulation of equation (1) of the exemplary deep learning model 104 results in the identification of the complete shape boundary 314, while processing the input image 302 via the U-Net results in the identification of an incomplete shape boundary 310.

Figure 4C:
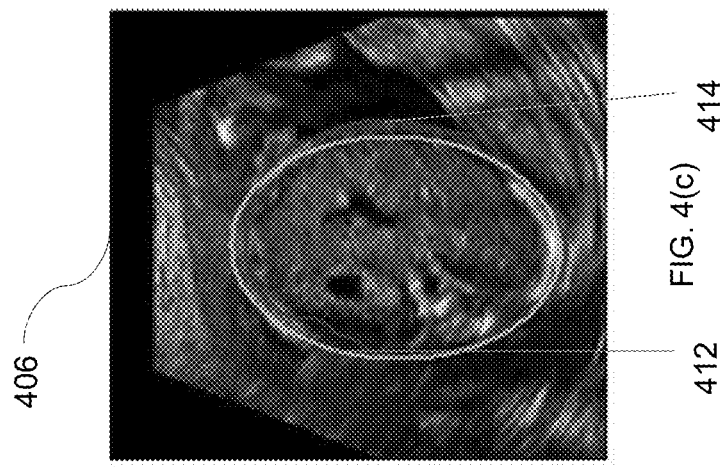
FIGS. 4(a)-4(c) are images illustrating a comparison of the performance of the deep learning model of FIG. 1 with the performance of an extant fully convolutional network in segmenting a fetal abdominal region from input images, in accordance with aspects of the present specification.
Figure 4B:
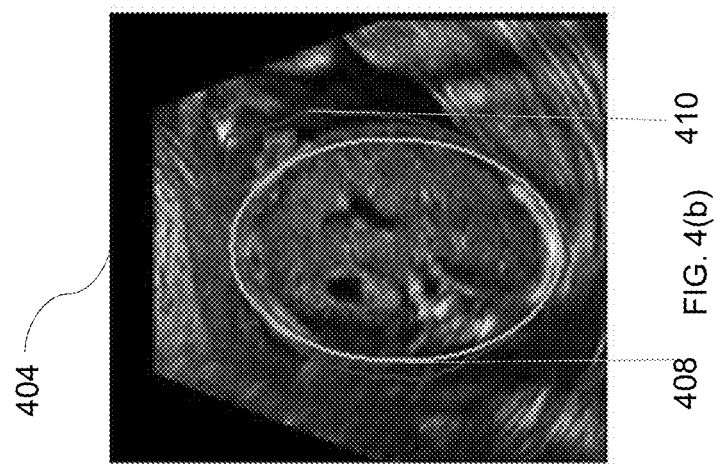
Figure 4A:
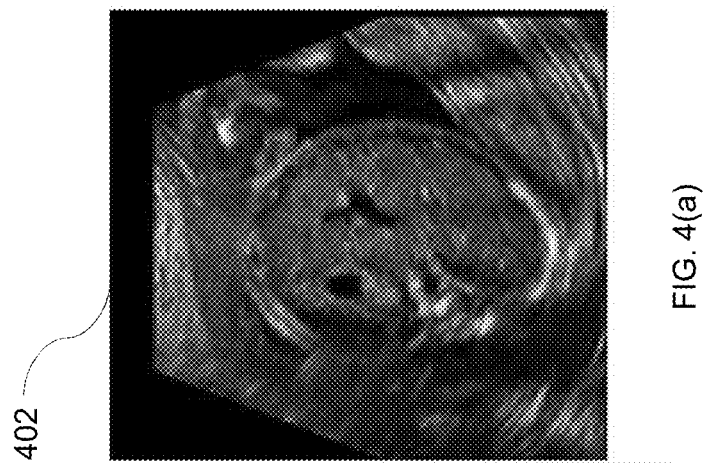

FIGS. 4(a)-4(c) are images illustrating a comparison of the performance of the exemplary deep learning model 104 of FIG. 1 with the performance of an extant FCN in segmenting a fetal abdominal region from input images, in accordance with aspects of the present specification. FIGS. 4(a)-4(c) provide a comparison of performance of currently available techniques such as U-Net and the exemplary deep learning model 104 in segmenting a fetal abdominal region from input images such as ultrasound images. FIG. 4(a) is representative of an input image 402 such as an ultrasound image that is provided to the deep learning model 104 and/or an extant FCN such as U-Net.

FIG. 4(b) is representative of an output image 404 generated by processing of the input ultrasound image 402 by the extant FCN U-Net. In a similar fashion, FIG. 4(c) represents an output image 406 generated by processing the input ultrasound image 402 by the deep learning model 104 implemented in accordance with the formulation FBS1 of equation (1).

In FIG. 4(b), reference numeral 408 is generally representative of a ground truth shape contour corresponding to a segmented shape of interest, such as the fetal abdominal region in the image 404. Reference numeral 410 is generally representative of a segmented shape contour corresponding to the segmented shape of interest in the image 404 that is generated by processing the input ultrasound image 402 by the U-Net.

Similarly, in FIG. 4(c), reference numeral 412 is generally representative of a ground truth shape contour corresponding to the segmented shape of interest, such as the fetal abdominal region in the image 406. Reference numeral 414 is generally representative of a segmented shape contour corresponding to the segmented shape of interest in the image 406 that is generated by processing the input ultrasound image 402 by the deep learning model 104.

As depicted in the illustrative examples of FIGS. 4(a)-4(c), the image 406 of FIG. 4(c) shows a 4% improvement in DICE coefficient overlap over the ground truth shape contour 412 in comparison to that of the U-Net generated image 404, which is significant especially in fetal biometry. Moreover, in the image 406, the segmented shape contour 414 generated by deep learning model 104 closely follows the fetal abdomen edges due to the modeling of the image foreground and background in addition to shape modeling.

It may be noted that joint learning of the foreground and background textures may obviate overfitting and generalization of the FCN with respect to medical images. With the foregoing in mind, FIGS. 5(a)-5(c) are images generated from the deep learning model 104 in response to an exemplary training phase with a set of kidney images and a testing phase with images of abdomens with different levels of abdominal fat.

In FIGS. 5(a)-5(c), a comparison of the performance of currently available techniques such as U-Net and the exemplary deep learning model 104 in segmenting an abdominal region from input images, in accordance with aspects of the present specification, are presented.

FIG. 5(a) is representative of an input image 502 such as an ultrasound image of an abdomen with high fat content that is provided to the deep learning model 104 and/or an extant FCN such as U-Net. Also, FIG. 5(b) is representative of an output image 504 generated by processing of the input ultrasound image 502 by an extant FCN U-Net. In a similar fashion, an output image 506 corresponds to an output generated by processing the input ultrasound image 502 by the deep learning model 104 implemented in accordance with formulation FBS1 of equation (1).

In FIG. 5(b), reference numeral 508 is generally representative of a ground truth shape contour corresponding to a segmented shape of interest, such as the abdominal region in the image 504. Reference numeral 510 is generally representative of a segmented shape contour corresponding to the segmented shape of interest in the image 504 that is generated by processing the input ultrasound image 502 by the U-Net.

In addition, in FIG. 5(c), reference numeral 512 is generally representative of a ground truth shape contour corresponding to the segmented shape of interest, such as the abdominal region in the image 506. Reference numeral 514 is generally representative of a segmented shape contour corresponding to the segmented shape of interest in the image 506 that is generated by processing the input ultrasound image 502 by the deep learning model 104.

It may be observed from the image 504 of FIG. 5(b) that the segmented shape contour 510 deviates significantly from ground truth shape contour 508. Furthermore, it may be observed from the image 506 of FIG. 5(c) that the segmented shape contour 514 and ground truth shape contour 512 show a significant overlap. Accordingly, it may clearly be seen from FIGS. 5(b) and 5(c) that the segmented shape contour 514 of FIG. 5(c) is more accurate than that of the segmented shape contour 510 of FIG. 5(b). Consequently, use of the deep learning model 104 results in more accurate morphological measurements. This can be attributed to the ability of the deep learning model 104 to learn foreground and background textures leading to robust modeling of context.

Figure 6:
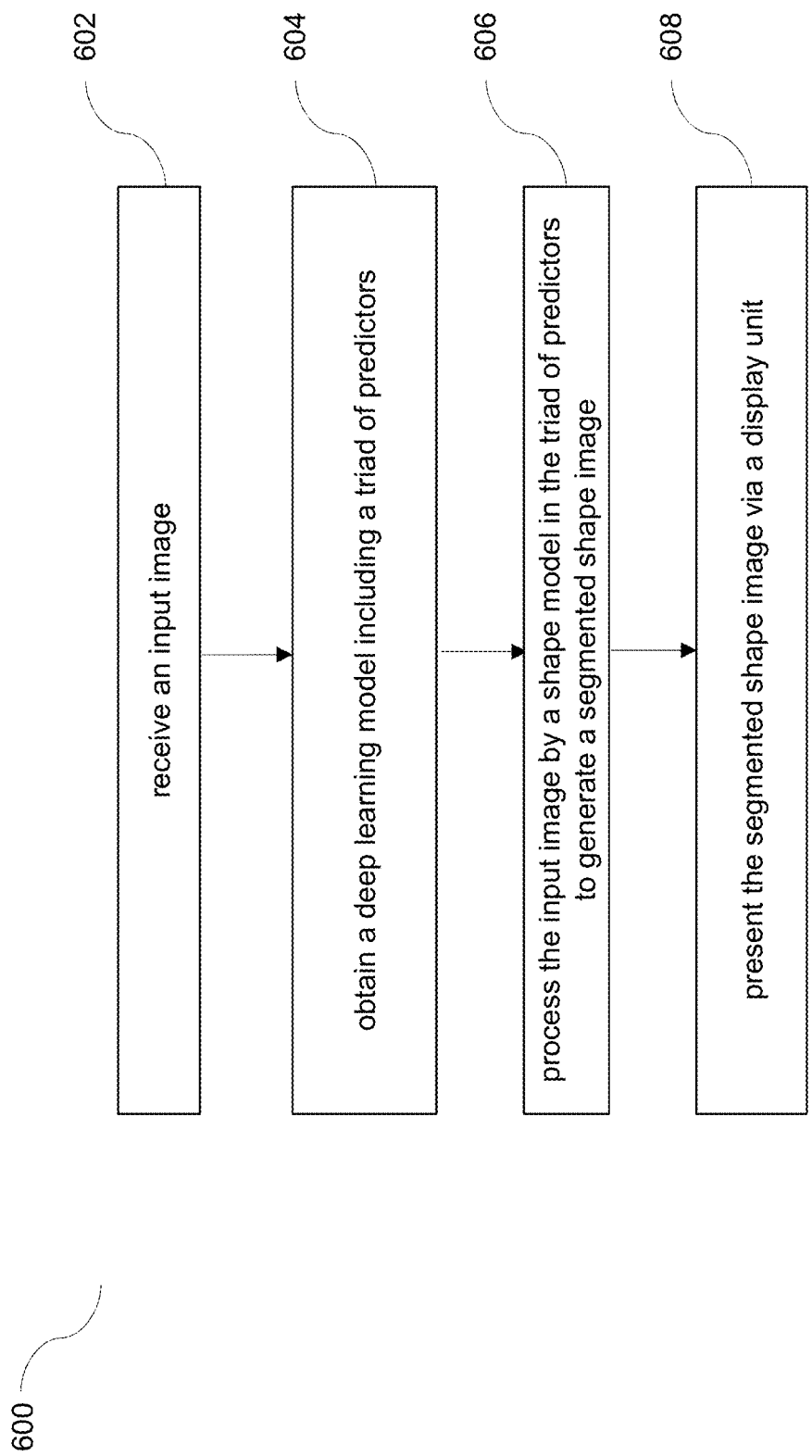
FIG. 6 is a flow chart of a method for image segmentation using a joint deep learning model, in accordance with aspects of the present specification.

FIG. 6 is a flow chart of a method 600 for segmenting an image using a joint deep learning model, in accordance with aspects of the present specification.

The method 600 includes receiving an input image, as indicated by step 602. The input image corresponds to a subject such as, but not limited to, a patient, an organ of interest, a machine part, luggage, and the like. Further, at step 604, a deep learning model is obtained. In one embodiment, the deep learning model includes a triad of predictors configured to predict a foreground texture, a background texture, and a segmented shape. Moreover, in certain embodiments, the step of obtaining the deep learning model includes generating a multi-channel fully convolutional neural network representative of the triad of predictors. In another embodiment, the step of obtaining the deep learning network includes formulating a joint cost function based on a plurality of foreground model weights, a plurality of background model weights, and a plurality of shape model weights. Further, the joint cost function is minimized to generate the foreground model, the background model, and the shape model. It may be noted that the foreground model includes the plurality of foreground model weights, the background model includes the plurality of background model weights, and the shape model includes the plurality of shape model weights.

In other embodiments, the joint cost function includes a foreground cost factor, a background cost factor, and a shape cost factor. The foreground cost factor is representative of a foreground modelling error, the background cost factor is representative of a background modelling error, and the shape cost factor is representative of a shape modelling error. The joint cost function is minimized by simultaneously minimizing the foreground cost factor, the background cost factor, and the shape cost factor.

In another embodiment, the joint cost function includes a shape cost factor, an appearance cost factor, and an overfitting cost factor. Accordingly, in this example, the joint cost function is minimized by simultaneously minimizing the shape cost factor, the appearance cost factor, and the overfitting cost factor.

Also, in one embodiment, the joint cost function is modified based on a priori information about the foreground, the background, and the shape. Specifically, the a priori information is representative of a geometric prior such as a length shortening prior, a curvature smoothness prior, a shape dictionary prior, reflectance, and the like. When the geometric prior is available, a projection cost factor, a representation cost factor, and/or a Euclidean cost factor are added to the joint cost function for each of the foreground cost factor, the background cost factor, and the shape cost factor. In one embodiment, the projection cost factor, the representation cost factor, and the Euclidean cost factor are generated based on a convolutional denoising autoencoder (CDAE).

In addition, at step 606, the input image is processed by a shape model in the triad of predictors to generate a segmented shape image. Furthermore, the segmented shape image may be visualized via use of the display unit 128 of FIG. 1, as depicted by step 608. In one embodiment, when the subject is a patient, the display of the segmented shape image facilitates provision of medical care to the subject.

Additionally, the method includes processing the input image by the foreground model and the background model in the triad of predictors. In particular, the input image is processed by the foreground model in the triad of predictors to generate a foreground texture image. Similarly, the input image is processed by the background model in the triad of predictors to generate a background texture image. Moreover, the foreground image and/or the background image may be visualized on the display unit 128. In the example where the subject is a patient, the display of the foreground image and/or the background image facilitates provision of medical care to the subject.

The system and method for joint deep learning using generative models for contextual segmentation of medical images presented hereinabove provide an alternative approach to robust contextual segmentation of medical images via the use of simultaneous learning predictors of foreground, background, and shape. Moreover, the generative modeling of foreground, background, and shape advantageously leverages the capabilities of the FCN in capturing context information. Furthermore, this approach provides results that are easy to interpret despite constraints of limited training data. Additionally, the approach enables easy transfer of learning across segmentation problems.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description.

The invention claimed is:

1. A method, comprising:
receiving an input image;
processing the input image with a deep learning model to generate a segmented image, wherein weights of the deep learning model are updated during training of the deep learning model according to a custom loss function determined based on segmented images output by the deep learning model, autoencoder output images generated by inputting the segmented images to a shape regularization network, and ground truth images; and
presenting the segmented image via a display unit;
wherein the deep learning model comprises a triad of predictors including a shape model, a foreground model, and a background model, wherein respective weights of the triad of predictors are updated during joint training of the triad of predictors of the deep learning model according to a joint loss function including the custom loss function, wherein the input image is processed with the shape model of the deep learning model to generate the segmented image.

2. The method of claim 1, further comprising processing the input image with the foreground model of the deep learning model to generate a foreground texture image, and processing the input image with the background model of the deep learning model to generate a background texture image.

3. The method of claim 2, further comprising presenting one or more of the foreground texture image and the background texture image via the display unit.

4. The method of claim 2, wherein processing the input image comprises generating at least one of the foreground texture image, the background texture image, and the segmented image using a parallel U-Net architecture comprising separate weights for each of the triad of predictors.

5. The method of claim 2, wherein processing the input image comprises generating at least one of the foreground texture image, the background texture image, and the segmented image using a shared U-Net architecture comprising shared weights for the triad of predictors.

6. The method of claim 1, wherein joint training of the triad of predictors of the deep learning model according to the joint loss function comprises simultaneously minimizing a foreground cost factor, a background cost factor, and a shape cost factor.

7. The method of claim 1, wherein the shape regularization network comprises a convolutional de-noising autoencoder.

8. A method, comprising:
receiving an input image;
processing the input image with a deep learning model to generate a segmented image, wherein weights of the deep learning model are updated during training of the deep learning model according to a custom loss function determined based on segmented images output by the deep learning model, autoencoder output images generated by inputting the segmented images to a shape regularization network, and ground truth images; and
presenting the segmented image via a display unit;
wherein the custom loss function includes a projection error cost term based on a distance between a predicted shape and a shape space, a representation error cost term based on a distance between an encoded representation of a ground truth segmentation mask and an encoded representation of a predicted mask, and a Euclidean cost term based on a distance between the ground truth segmentation mask and the predicted mask.

9. A system, comprising:
an image acquisition unit configured to acquire an input image;
a display unit;
a deep learning unit comprising a deep learning model, wherein weights of the deep learning model are updated during training of the deep learning model according to a custom loss function determined based on segmented images output by the deep learning model, autoencoder output images generated by inputting the segmented images to a shape regularization network, and ground truth images, wherein the deep learning unit is configured to process the input image with the deep learning model to generate a segmented image; and a processor unit communicatively coupled to the deep learning unit and the display unit, wherein the processor unit is configured to present the segmented image via the display unit;

wherein the deep learning model comprises a triad of predictors including a shape model, a foreground model, and a background model, wherein respective weights of the triad of predictors are updated during joint training of the triad of predictors of the deep learning model according to a joint loss function including the custom loss function, wherein the deep learning unit processes the input image with the shape model of the deep learning model to generate the segmented image.

10. The system of claim 9, wherein the deep learning unit is further configured to:

process the input image with the foreground model of the deep learning model to generate a foreground texture image; and process the input image with the background model of the deep learning model to generate a background texture image.

11. The system of claim 10, wherein the processor unit is further configured to: present one or more of the foreground texture image and the background texture image via the display unit.

12. The system of claim 9, wherein the deep learning unit is configured to perform the joint training of the triad of predictors of the deep learning model according to the joint loss function by simultaneously minimizing a foreground cost factor, a background cost factor, and a shape cost factor.

* * * * *